(12) United States Patent
Takeda et al.

(10) Patent No.: US 11,332,054 B2
(45) Date of Patent: May 17, 2022

(54) VEHICLE SEAT

(71) Applicant: TACHI-S CO., LTD., Tokyo (JP)

(72) Inventors: Masakazu Takeda, Tokyo (JP); Mitsuru Tsukada, Tokyo (JP); Keita Myochin, Tokyo (JP); Tatsuya Iwasaki, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 16/980,530

(22) PCT Filed: Mar. 6, 2019

(86) PCT No.: PCT/JP2019/008925
§ 371 (c)(1),
(2) Date: Sep. 14, 2020

(87) PCT Pub. No.: WO2019/176697
PCT Pub. Date: Sep. 19, 2019

(65) Prior Publication Data
US 2021/0001759 A1    Jan. 7, 2021

(30) Foreign Application Priority Data

Mar. 16, 2018  (JP) .............................. JP2018-049894
Mar. 16, 2018  (JP) .............................. JP2018-049898
Mar. 16, 2018  (JP) .............................. JP2018-049901
Mar. 16, 2018  (JP) .............................. JP2018-049903

(51) Int. Cl.
*B60N 2/68* (2006.01)
*B60N 2/005* (2006.01)

(52) U.S. Cl.
CPC .............. *B60N 2/686* (2013.01); *B60N 2/005* (2013.01); *B60N 2/682* (2013.01)

(58) Field of Classification Search
CPC ........ B60N 2/686; B60N 2/682; B60N 2/005; B60N 2/64; B60N 2/36; B60N 2/68

USPC ..................................................... 297/452.18
See application file for complete search history.

(56) References Cited

U.S. PATENT DOCUMENTS 11,059,404 B2 *  7/2021  Okuma ................. B60N 2/757
2003/0062759 A1   4/2003  Gupta et al.
(Continued)

FOREIGN PATENT DOCUMENTS

CN          1541168 A      10/2004
CN        107187361 A       9/2017
(Continued)

OTHER PUBLICATIONS

May 28, 2019, International Search Report issued for related PCT application No. PCT/JP2019/008925.
(Continued)

*Primary Examiner* — Mark R Wendell
(74) *Attorney, Agent, or Firm* — Paratus Law Group, PLLC

(57) ABSTRACT

A vehicle seat (10) has a seat cushion (20) and a seat back (30), which are affixed to the body of a vehicle. The seat back (30) has: a first member (50) which is formed in a plate-like shape; and a second member (60) with a hat-shaped cross-section, which is configured so that a flange section (61) is in contact with one surface, in a thickness direction, of the first member (50). A center bead (52) is provided at the center portion of the first member (50). The center bead (52) is configured so that a longitudinal end of the center bead (52) and the second member (60) are overlapped in a plan view viewed in the thickness direction of the first member (50). As a result, the first member (50) of the seat back (30) is prevented from being deformed at the longitudinal end of the center bead (52).

23 Claims, 9 Drawing Sheets

(56) References Cited

U.S. PATENT DOCUMENTS

| | | |
|---|---|---|
| 2004/0160089 A1 | 8/2004 | Gupta et al. |
| 2005/0082896 A1 | 4/2005 | Gupta et al. |
| 2008/0258520 A1 | 10/2008 | Uchida |
| 2017/0267128 A1 | 9/2017 | Tomita et al. |
| 2019/0084457 A1 | 3/2019 | Okuma et al. |
| 2020/0114792 A1 | 4/2020 | Okuma et al. |

FOREIGN PATENT DOCUMENTS

| | | |
|---|---|---|
| JP | 2003-252251 A | 9/2003 |
| JP | 2008-105593 A | 5/2008 |
| JP | 2012-162224 A | 8/2012 |
| JP | 5966713 B2 | 8/2016 |
| JP | 2017-218006 A | 12/2017 |
| WO | WO 2017/073484 A1 | 5/2017 |

OTHER PUBLICATIONS

May 28, 2019, International Search Opinion issued for related PCT application No. PCT/JP2019/008925.
Oct. 21, 2019, International Written Opinion issued for related PCT application No. PCT/JP2019/008925.
Jan. 14, 2020, International Preliminary Report on Patentability issued for related PCT application No. PCT/JP2019/008925.
Feb. 21, 2022, Chinese Office Action issued for related CN Application No. 201980019759.5.

* cited by examiner

VEHICLE SEAT

CROSS REFERENCE TO PRIOR APPLICATION

This application is a National Stage Patent Application of PCT International Patent Application No. PCT/JP2019/008925 (filed on Mar. 6, 2019) under 35 U.S.C. § 371, which claims priority to Japanese Patent Application Nos. 2018-049894 (filed on Mar. 16, 2018), 2018-049898 (filed on Mar. 16, 2018), 2018-049901 (filed on Mar. 16, 2018), and 2018-049903 (filed on Mar. 16, 2018), which are all hereby incorporated by reference in their entirety.

TECHNICAL FIELD

The present invention relates to a vehicle seat.

BACKGROUND ART

As a vehicle seat mounted on a vehicle such as an automobile, a vehicle having a seatback that is tiltable with respect to a seat cushion is known. In such a vehicle seat, the seatback is rotatably and fixably supported at a lower end portion and is releasably fixed to a vehicle body at a width-direction end portion of an upper end portion (see, for example, Patent Literature 1). Further, in such a vehicle seat, a seat belt that secures safety of an occupant is provided, and a seat belt retractor for winding the seat belt is attached to the seatback (see, for example, Patent Literature 1).

CITATION LIST

Patent Literature

Patent Literature 1: JP5966713B

SUMMARY OF INVENTION

Technical Problem

In the vehicle seat as disclosed in Patent Literature 1, since an upper end of the seatback is supported at a point, a strength member of the seatback is not only formed of a ribbed plate member, but also reinforced by a pipe frame in order to increase rigidity of the seatback.

Differently from the above-described vehicle seat, a structure in which a pipe frame is not used may be provided with a large number of beads, which protrude from a front surface and a back surface of a plate member, in order to reinforce the plate member of the seatback. In a case of such a structure, rigidity of a longitudinal end portion of the bead may be insufficient and deformation of the plate member may start therefrom. Further, in a case where beads are provided along an outer periphery of the plate member, when the beads provided in the periphery are continuous, planar portions of a bottom surface and a top surface of the bead is continuous along the longitudinal direction and may be deformed in a mountain-fold manner or valley-fold manner.

Further, in the vehicle seat disclosed in Patent Literature 1, the plate member of the seatback is reinforced by a reinforcing frame provided along the outer periphery. Further, a reinforcing member for attaching the seat belt retractor is attached to the reinforcing frame. That is, since the reinforcing member is a member separate from the plate member and the reinforcing frame, the number of components increases and the number of assembly steps increases.

Further, in the vehicle seat disclosed in Patent Literature 1, a shaft portion is provided in the plate member of the seatback, and the seatback is rotatably supported by the shaft portion. Accordingly, since stress is particularly concentrated in a portion where the shaft portion is provided in the plate member, the plate member is reinforced by a reinforcing member. When the seatback includes the plate member and the reinforcing frame that reinforces an outer peripheral portion of the plate member, it may be desired to reinforce a predetermined portion.

The present invention has been made in view of the above circumstances, and an object of the present invention is to provide a vehicle seat in which a plate member of a seatback can be prevented from being deformed at a longitudinal end portion of a bead. Another object of the present invention is to provide a vehicle seat in which a bead provided in a periphery of a plate member of a seatback is less likely to be deformed. Another object of the present invention is to provide a vehicle seat in which an increase in the number of components and an increase in the number of assembly steps can be prevented. Another object of the present invention is to provide a vehicle seat in which a predetermined portion can be reinforced in a case where a plate member and a reinforcing frame that reinforces the plate member are provided.

Solution to Problem

A vehicle seat according to an aspect of the present invention includes a seat cushion and a seatback that are fixed to a body of a vehicle. The seatback includes a first member having a plate shape, a second member having a hat-shaped cross section of which a flange portion is in contact with one surface of the first member in a thickness direction thereof, and a center portion bead provided at a center portion of the first member. In a plan view viewed along the thickness direction of the first member, the second member overlaps with a longitudinal end portion of the center portion bead.

A vehicle seat according to an aspect of the present invention includes a seat cushion and a seatback that are fixed to a body of a vehicle. The seatback includes a first member having a plate shape, a second member having a hat-shaped cross section of which a flange portion is in contact with one surface of the first member in a thickness direction thereof, and accommodation beads provided at a portion of the first member which is covered by the second member. In a plan view viewed along a stacking direction of the first member and the second member, the accommodation beads are provided at a predetermined interval along a continuous direction of the second member.

A vehicle seat according to an aspect of the present invention includes a seat cushion and a seatback that are fixed to a body of a vehicle. The seatback includes a first member having a plate shape, a second member having a hat-shaped cross section of which a flange portion is in contact with one surface of the first member in a thickness direction thereof, and a fixing portion supported by one of the first member and the second member and configured to fix a retractor. In a plan view viewed along a stacking direction of the first member and the second member, a surrounding bead surrounding the fixing portion is provided on one of the first member and the second member.

A vehicle seat according to an aspect of the present invention includes a seat cushion and a seatback that are fixed to a body of a vehicle. The seatback includes a first member having a plate shape, a second member having a hat-shaped cross section of which a flange portion is in contact with one surface of the first member in a thickness direction thereof, and a plate member provided between the first member and the second member.

Advantageous Effects of Invention

According to the present invention, there is provided a vehicle seat in which a plate member of a seatback can be prevented from being deformed at a longitudinal end portion of a bead. There is also provided a vehicle seat in which beads provided around a plate member of a seatback are less likely to be deformed. There is also provided a vehicle seat in which an increase in the number of components and an increase in the number of assembly steps can be prevented. There is also provided a vehicle seat in which a predetermined portion can be reinforced in a case where a first member in a plate shape and a second member that reinforces the first member are provided.

DESCRIPTION OF EMBODIMENTS

First Embodiment

Figure 1:
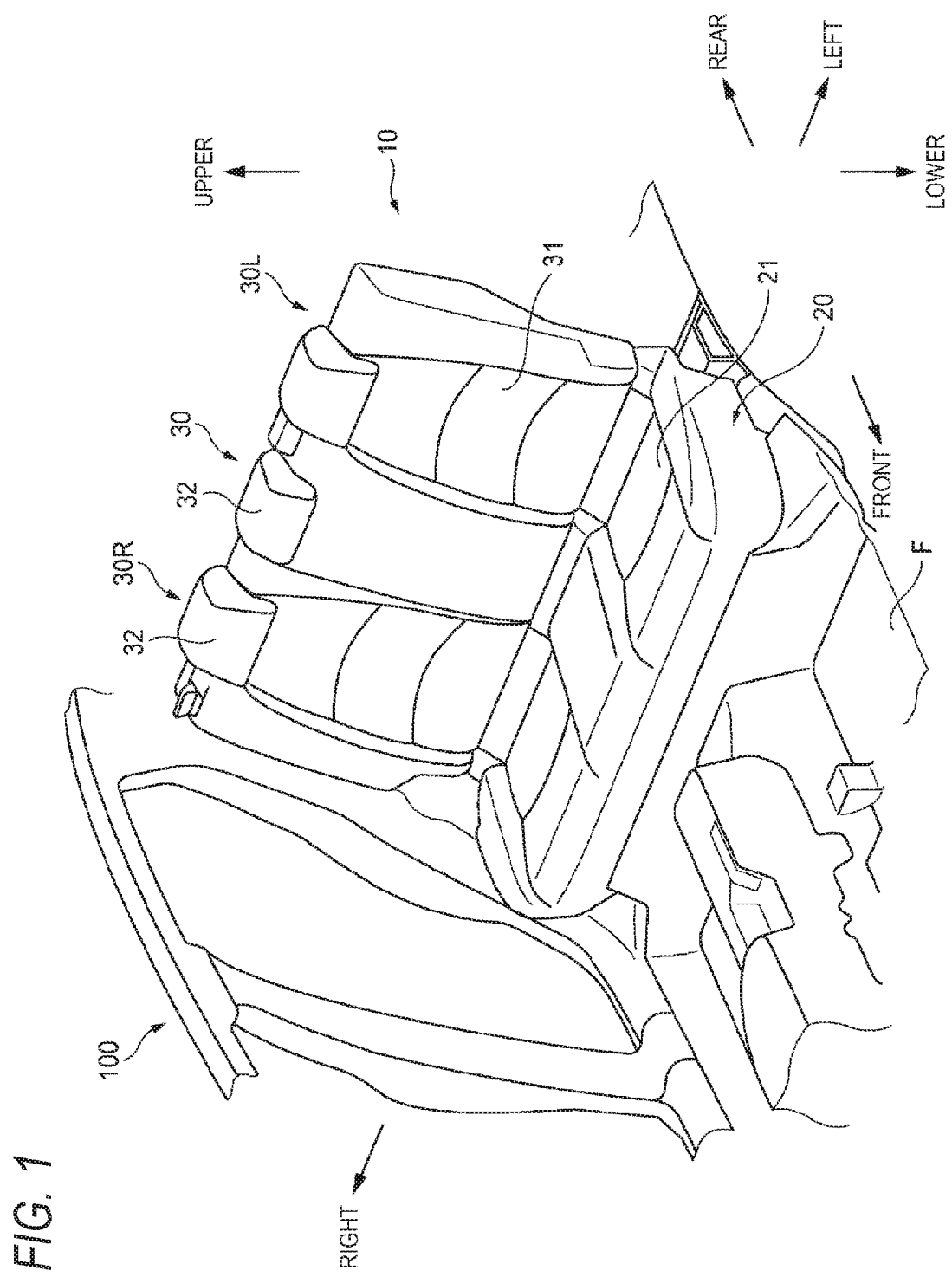
FIG. 1 is a perspective view of a rear seat as a vehicle seat of the present invention.

FIG. 1 shows an overall vehicle seat 10 for illustrating an embodiment of the present invention.

In the following description, a front side of the vehicle is indicated as "front" and a rear side of the vehicle as "rear". Facing the front of the vehicle, a right side is indicated as "right", a left side as "left" an upper side as "upper" and a lower side as "lower".

FIG. 1 shows, for example, a rear seat (second row) of a vehicle as the vehicle seat 10. The vehicle seat 10 includes a seat cushion 20 that is mounted on a body 100 of an automobile or the like and that can be mainly seated by an occupant, and a seatback 30 that supports the back of the seated occupant.

The seat cushion 20 is an integral bench seat in a vehicle width direction (left-right direction), and has a cushion frame (not illustrated) and a cushion material (not illustrated) provided on the cushion frame, and a surface of the seat cushion 20 is covered with a cushion skin 21 such as fabric or leather. The seat cushion 20 is attached to a floor F of the body 100.

Note that the seat cushion 20 may be split into left and right seat cushions.

Figure 2:
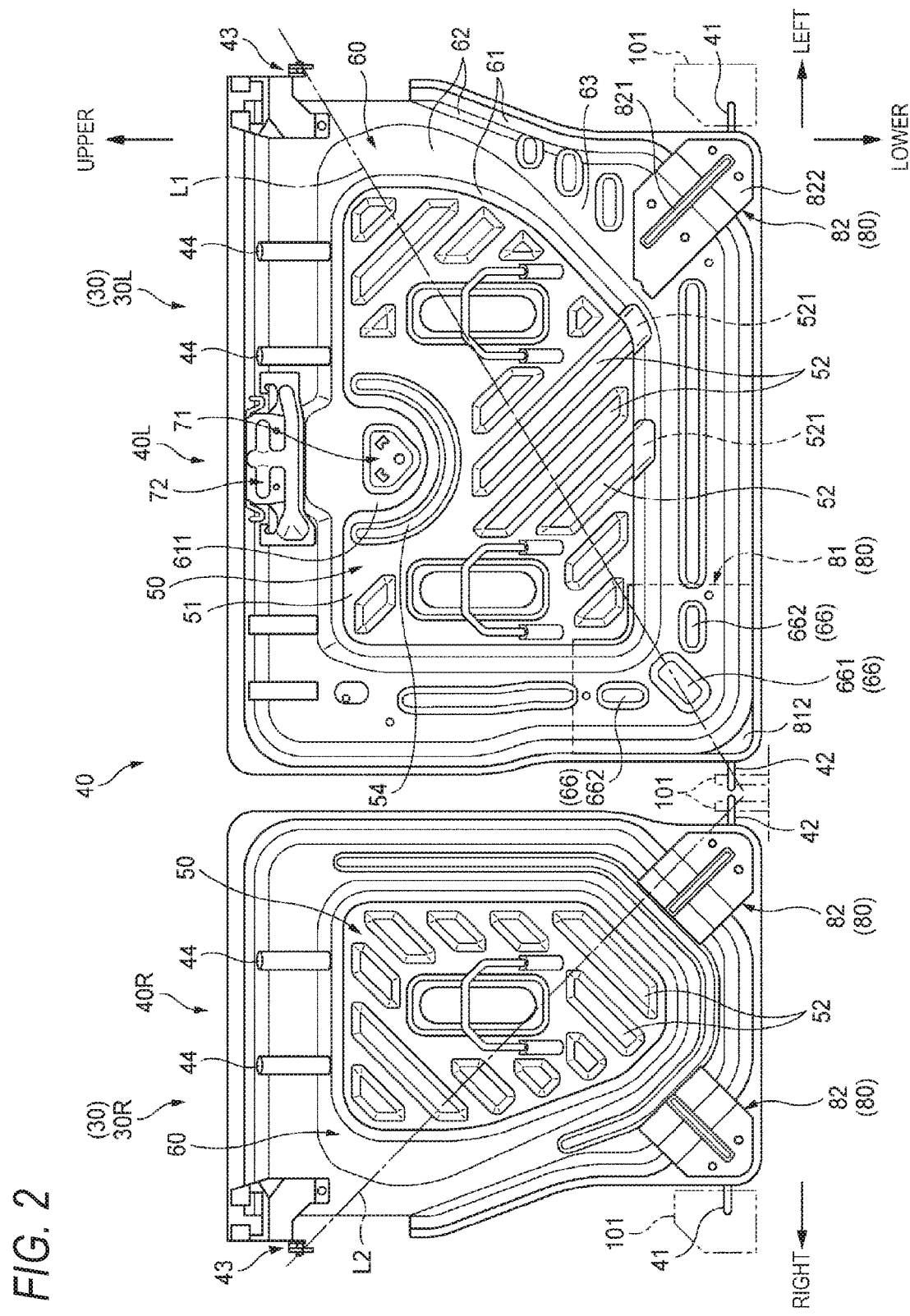
FIG. 2 is a front view of a back frame of a seatback as viewed from the front.

As illustrated in FIG. 2, the seatback 30 is a split type which can be split into left and rights seatbacks, and includes a right seatback 30R and a left seatback 30L. Although a ratio, of length in a left-right direction, of the right seatback 30R to the left seatback 30L is 4:6 in this example, the ratio is not limited thereto, and may be, for example, 6:4 or 5:5.

The seatback 30 has a back frame 40 that is plate-shaped and a cushion material (not illustrated) that is attached to a front side of the back frame 40, and a surface of the seatback 30 is covered with a back skin 31 such as fabric or leather (see FIG. 1).

In the following description, similar components are denoted by the same reference numerals, and in particular, at the time of distinguishing between the right seatback 30R and the left seatback 30L, "R" and "L" are added to the common components correspondingly for distinguishing. Further, in a state where the seatback 30 stands upright, the upper side is displayed as "upper" and the lower side is displayed as "lower".

At both ends of lower ends of a right back frame 40R constituting the right seatback 30R and a left back frame 40L constituting the left seatback 30L, a shaft portion (second connection portion, hinge portion) 41 and a shaft portion (third connection portion, hinge portion) 42 are provided, and are rotatably supported by a bearing portion 101 provided in the body 100.

The bearing portion 101 may be provided with a reclining device that can tilt and fix the seatback 30 at a desired angle with respect to the seat cushion 20.

At an outer end portion of upper ends of the right back frame 40R and the left back frame 40L in a width direction of the body 100, a seatback fixing portion (first connection portion) 43 for fixing the back frames 40R and 40L to the body 100 is provided. A headrest 32 is detachably attached to an upper side of each of the seatbacks 30R and 30L (see FIG. 1), and a headrest attachment portion 44 for attaching the headrest 32 is provided on an upper portion of each of the back frames 40R and 40L.

As illustrated in FIG. 2, the back frame 40 has a first member 50 that is plate-shaped and that is made of a metal plate having a thickness of, for example, 0.7 mm or less, and a second member 60 that is attached to one surface (here a front surface (planar portion) 51) of the first member 50 in a thickness direction thereof and that is made of a metal plate having a thickness of, for example, 0.7 mm or less.

Since the right back frame 40R and the left back frame 40L have similar structures, the left back frame 40L having large area will be described in the following description unless otherwise required.

The second member 60 is attached in a closed frame shape along an outer peripheral edge of the first member 50. Accordingly, the entire first member 50 can be reliably reinforced.

Note that the first member 50 is not limited to a frame shape, and may be formed in a C shape, or a shape in which a pair of C shapes are directed so as to face each other.

Figure 3A:
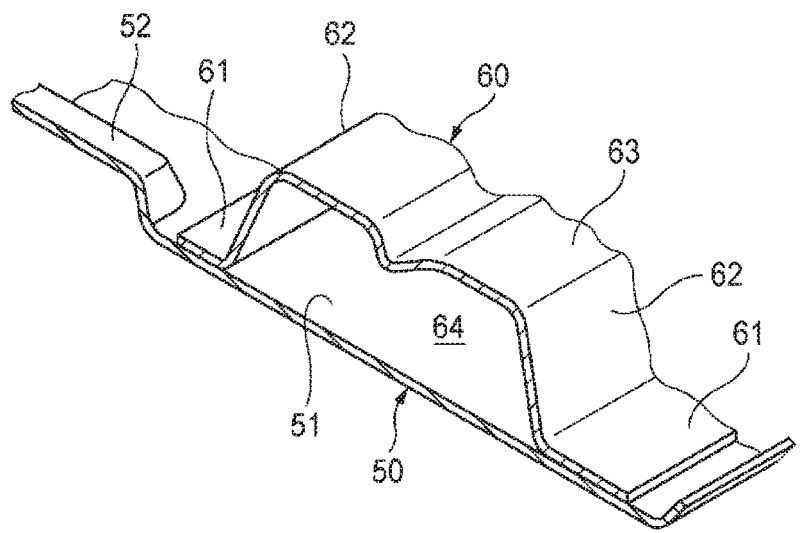
FIG. 3A is a cross-sectional view illustrating a state where a second member is attached to a planar portion of a first member.
Figure 3B:
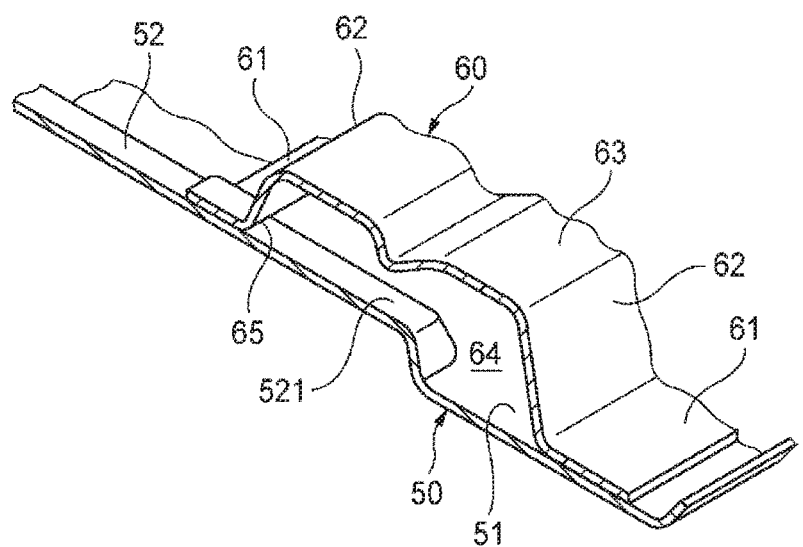
FIG. 3B is a cross-sectional view at a position where a center portion bead extends to an inner portion of the second member.

As illustrated in FIGS. 3A and 3B, the second member 60 has a flange portion 61 provided on both sides thereof, a pair of vertical wall portions 62 rising from inner side edges of the flange portion 61, and a planar top plate (planar portion) 63 connecting upper ends (front ends) of the pair of vertical wall portions 62, and has a hat-shaped cross section having a hollow portion 64 therein. The second member 60 is attached by welding such that a lower surface of the flange portion 61 is in contact with a front surface 51 of the first member 50.

As illustrated in FIG. 2, when the left seatback 30L is used, the left back frame 40L is supported at three points by a pair of left and right shaft portions 41 and 42 at a lower end portion thereof and one seatback fixing portion 43 on the outer side in the width direction at an upper end portion thereof.

Therefore, in the first member 50, an external force acts in a direction of bending in a virtual line (line) L1 connecting the seatback fixing portion 43 and the shaft portion 42 that is on a diagonal line with the seatback fixing portion 43. In order to resist this external force, a plurality of center portion beads 52 are provided in parallel at a central portion that is an inner side of the second member 60 in the first member 50, and the center portion beads 52 are provided parallel to a direction that is substantially orthogonal to the virtual line L. Accordingly, even when the left back frame 40L is connected at three points, the strength can be reliably secured.

In manufacturing the first member 50, the center portion beads 52 can be formed at the same time by press working. The center portion bead 52 can have, for example, a cross section having a partially circular arc shape, a trapezoid shape or the like, and is formed in a protruding manner toward a second member 60, that is, forward. Accordingly, since the center portion bead 52 does not protrude on a rear surface (surface opposite the front surface 51) of the first member 50, a flat cargo compartment surface can be secured in a state where the seatback 30 is laid down and stacked on the seat cushion 20.

In a plan view viewed along the thickness direction of the first member 50, the center portion bead 52 has, at a longitudinal end portion thereof, an overlapping portion 521 that overlaps with the second member 60. That is, as illustrated in FIG. 3B, the second member 60 is provided with a tunnel portion 65 correspondingly to the center portion bead 52, in parts of the flange portion 61 and the vertical wall portion 62, and the center portion bead 52 passes through the tunnel portion 65 to form the overlapping portion 521. Accordingly, the first member 50 of the left back frame 40L can be prevented from being deformed at the longitudinal end portion of the center portion bead 52.

In the tunnel portion 65, the overlapping portion 521 of the center portion bead 52 and the second member 60 are not joined by welding in order to relieve stress.

The overlapping portion 521 may be provided at both ends of the center portion bead 52, and can be provided only at one end portion as illustrated in FIG. 2. The overlapping portion 521 can be provided in all of the center portion beads 52, and is provided in a part of the center portion beads 52 here.

As illustrated in FIG. 3B, the overlapping portion 521 reaches the hollow portion 64 of the second member 60, and may extend to the flange portion 61 without reaching the hollow portion 64.

Although the overlapping portion 521 is not provided in the center portion bead 52 of the first member 50 of the right back frame 40R in FIG. 2, the overlapping portion 521 can be provided in the same manner as in the left back frame 40L.

Figure 4:
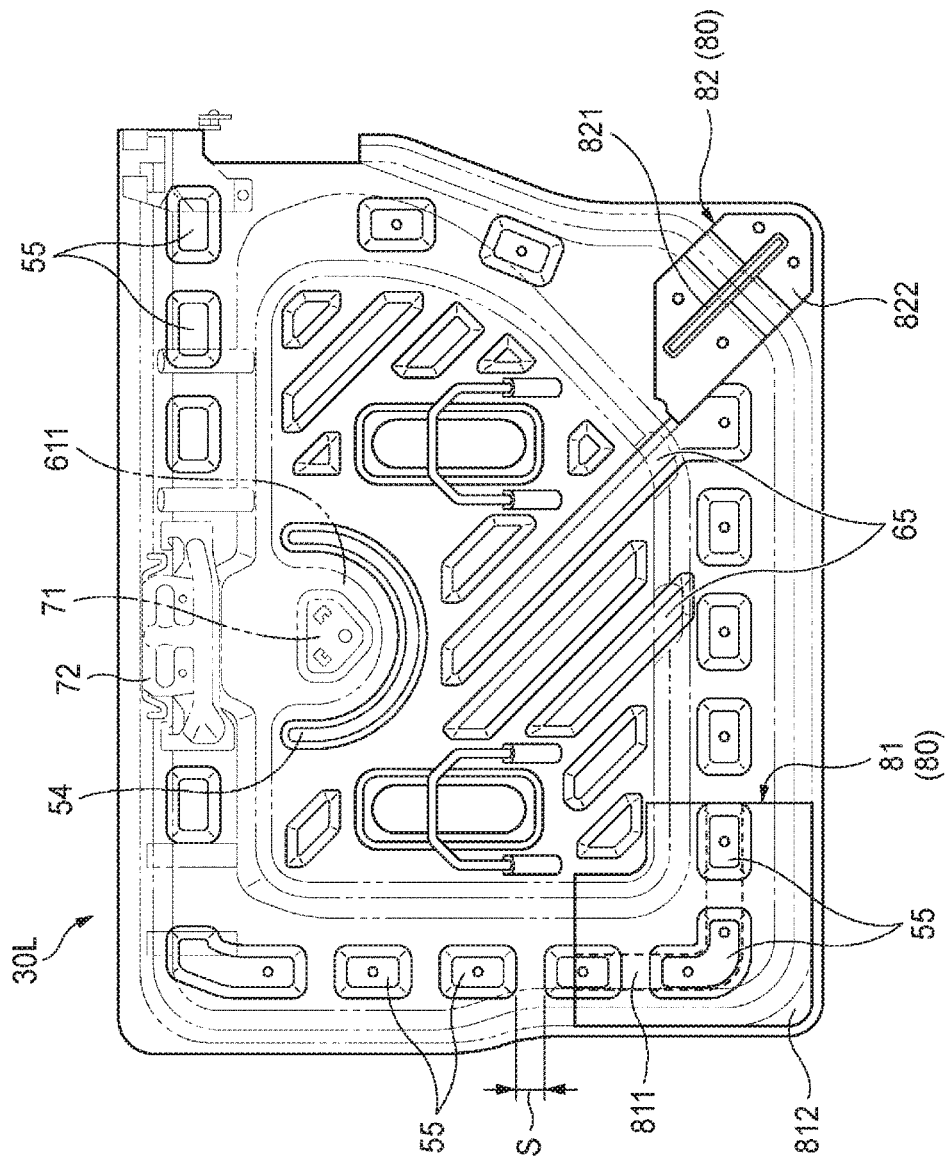
FIG. 4 is a front view of a back frame which is obtained by viewing through the second member.

As illustrated in FIGS. 2 and 4, a flange extension portion 611, which is semicircular tongue-shaped and is formed by extending the flange portion 61 of the second member 60 downward along the front surface 51 of the first member 50, is provided on an upper portion of the front surface 51 of the first member 50. The flange extension portion 611 is provided with a retractor fixing portion (fixing portion) 71 for attaching a retractor that winds the seat belt and locks the seat belt in an emergency. On a top plate 63 of the second member 60 corresponding to an upper side of the retractor fixing portion 71, a belt guide portion 72 that guides the seat belt is provided.

In the first member 50 on an outer side of the semicircular flange extension portion 611 of the second member 60, a surrounding bead 54 is provided in a semicircular shape along the flange extension portion 611. Accordingly, since the first member 50 corresponding to the retractor fixing portion 71 is reinforced, an increase in the number of components and an increase in the number of assembly steps can be prevented, and strength of the retractor fixing portion 71 can be improved. Further, since the retractor fixing portion 71 is attached to the first member 50 via the flange extension portion 611 of the second member, the strength of the retractor fixing portion 71 is further improved.

Figure 5:
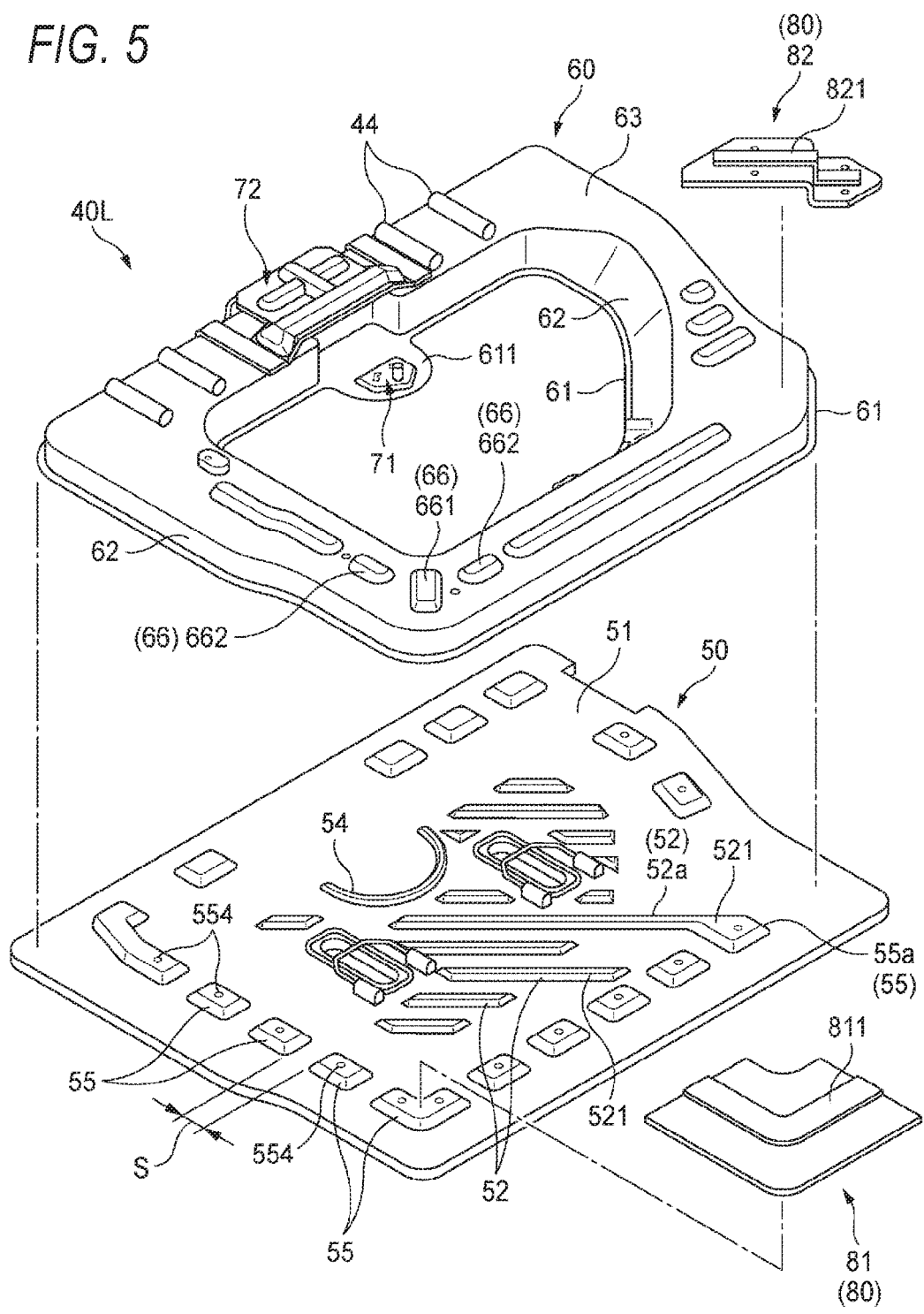
FIG. 5 is an exploded perspective view of the back frame.
Figure 6:
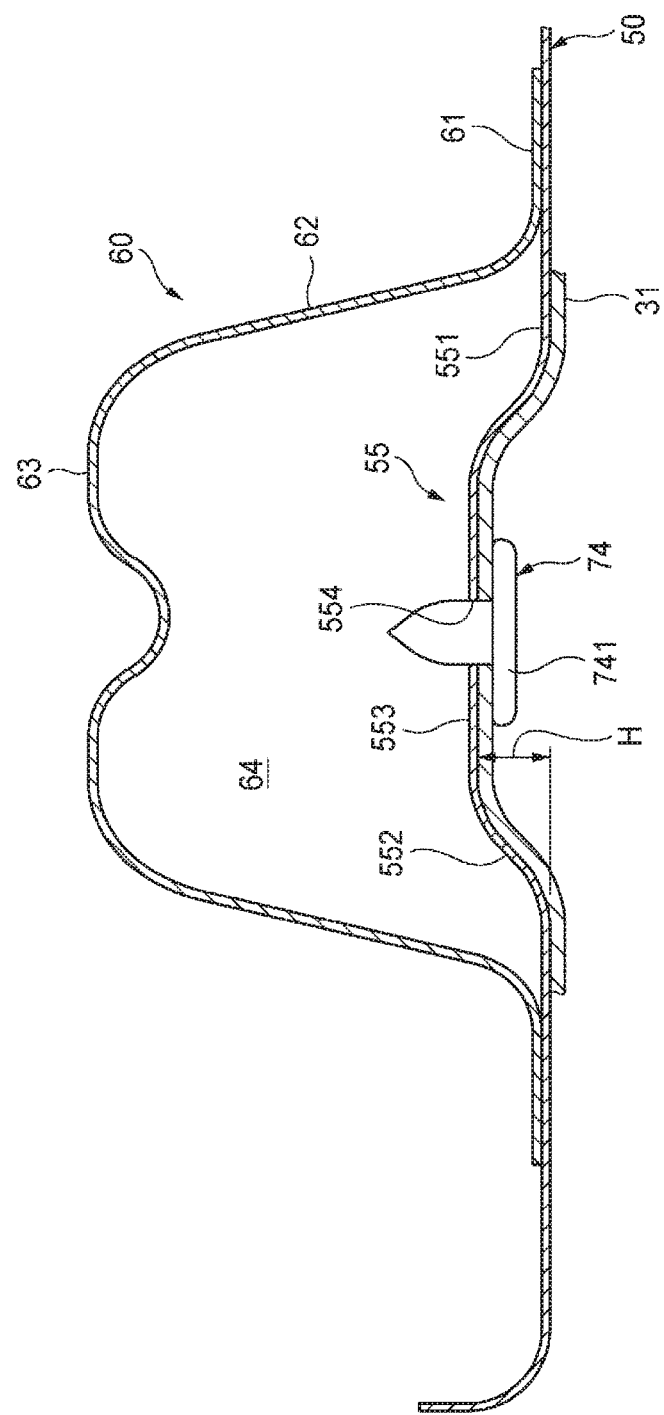
FIG. 6 is a cross-sectional view illustrating an accommodation bead that is provided on the first member, and the second member that accommodates the accommodation bead.

As illustrated in FIGS. 4 and 5, at a portion of the first member 50 which is covered by the second member 60, a plurality of accommodation beads 55 are provided so as to be accommodated in the hollow portion 64 of the second member 60 (see FIG. 6). An interval S of a predetermined size is provided between the adjacent accommodation beads 55.

Accordingly, deformation of the accommodation beads 55 can be prevented as compared with a case where the accommodation beads 55 are continuous.

As illustrated in FIG. 5, in a center portion bead 52a, the overlapping portion 521 is continuous with the an accommodation bead 55a, and as can be seen when viewing the accommodation bead 55a along an installation direction of the second member 60, the adjacent accommodation beads 55 are provided with the interval S therebetween and are separated from each other.

As illustrated in FIG. 6, the accommodation bead 55 is formed in a protruding manner toward the second member 60, and has a flange portion 551, a vertical wall portion 552, and a planar portion 553. The planar portion 553 is provided with a through-hole 554. A trim clip 74 for attaching the back skin 31 is attached in the through-hole 554. At this time, a protruding dimension H of the accommodation bead 55 is set to be larger than a thickness of the head 741 so that a head portion 741 of the trim clip 74 does not protrude toward the first member 50.

It is unnecessary to provide the through-hole 554 in the accommodation bead 55 located at a portion (for example, an upper edge end portion of the first member 50) that is not required to attach the back skin 31.

As illustrated in FIGS. 4 and 5, a plate member 80 is provided at a predetermined portion at a lower end portion of the first member 50 so as to abut the first member 50 and the second member 60 from above or to be disposed therebetween. A thickness of the plate member 80 is larger than thicknesses of the first member 50 and the second member 60 (for example, 0.7 mm or less), and can be, for example, about 1.2 mm to 5 mm. Accordingly, the predetermined portion of the first member 50 can be easily and reliably reinforced.

As illustrated in FIGS. 4 and 5, a first plate member 81 in a flat plate shape is interposed between the first member 50 and the second member 60 on the right shaft portion 42 (see FIG. 2) to which a largest load is applied in the first member 50. The first plate member 81 has an exposed portion 812 exposed to the outside from the flange portion 61 of the second member 60, and the shaft portion 42 is provided on a side of the first member 50 corresponding to the exposed portion 812, opposite form the second member 60. Accordingly, the shaft portion 42 can be firmly attached to the first member 50.

The first plate member 81 has an L shape in a plan view, and in a center in a width direction, a plate member bead 811 having an internal space on a lower surface side is provided in a protruding manner toward the second member 60, so that the accommodation bead 55 provided on the first member 50 is not interfered. Accordingly, it is possible to avoid interference with the accommodation bead 55 and to increase rigidity of the first plate member 81.

The first member 50, the second member 60, and the first plate member 81 can be welded at one time by laser welding or spot welding in a state where the three are stacked on each other. Accordingly, the number of steps can be reduced to improve the work efficiency, and the first member 50, the second member 60, and the first plate member 81 can be reliably joined.

At this time, when welding is performed from the first member 50 side and the first plate member 81 is penetrated to join the second member 60, welding conditions are adjusted so as not to penetrate the flange portion 61 of the second member 60.

It is also possible to perform welding from the second member 60 side, and in this case, the welding is performed so as not to penetrate the first member 50. As the welding, for example, welding using a laser can be performed. Further, it is preferred that a non-welded portion is provided so that a welded portion does not exceed a predetermined length, instead of that the welding is performed continuously in the longitudinal direction along the flange portion 61 of the second member 60.

As illustrated in FIGS. 2 and 5, a planar portion bead 66 is provided on the top plate 63 of the second member 60 at a portion where the first plate member 81 is provided. The planar portion bead 66 has a first planar portion bead 661 provided at a portion corresponding to a corner portion of the second member 60 and the first plate member 81, and a second planar portion bead 662 provided on both sides of the first planar portion bead 661.

The first planar portion bead 661 is a projecting bead projecting toward a front surface side of the top plate 63, and is provided in a direction directed toward the corner portion of the second member 60. Meanwhile, the second planar portion bead 662 is a recessed bead projecting toward an inner surface side of the top plate 63, and is provided in a direction along the frame-shape second member 60. The reason why bead direction of the planar portion bead 66 is set to be recessed, projecting, and recessed as described is that, when a force acts in a direction of folding along the virtual line L1, there is a risk that folding cannot be prevented in beads having a uniform direction of being projecting or recessed. Therefore, the bead direction of the planar portion bead 66 is set to be recessed, projecting and recessed as described so as not to be uniform. Accordingly, folding can be reliably prevented.

As illustrated in FIGS. 4 and 5, a second plate member 82 in a crank shape is provided along the front surface 51 of the first member 50, a surface of the flange portion 61 of the second member 60, a surface of the vertical wall portion 62, and a surface of the top plate 63, correspondingly to the left shaft portion 41 (see FIG. 2). A plate member bead 821 protruding in a direction away from the first member 50 is provided on a surface of the second plate member 82. Accordingly, rigidity of the entire frame can be improved, and the first member 50 can be reliably reinforced.

The second plate member 82 has an exposed portion 822 exposed to the outside from the flange portion 61 of the second member 60, and the shaft portion 41 is provided at a portion corresponding to the exposed portion 822 on a side of the first member 50 opposite form the second member 60 (see FIG. 2). Accordingly, the shaft portion 41 can be firmly attached to the first member 50.

Figure 7:
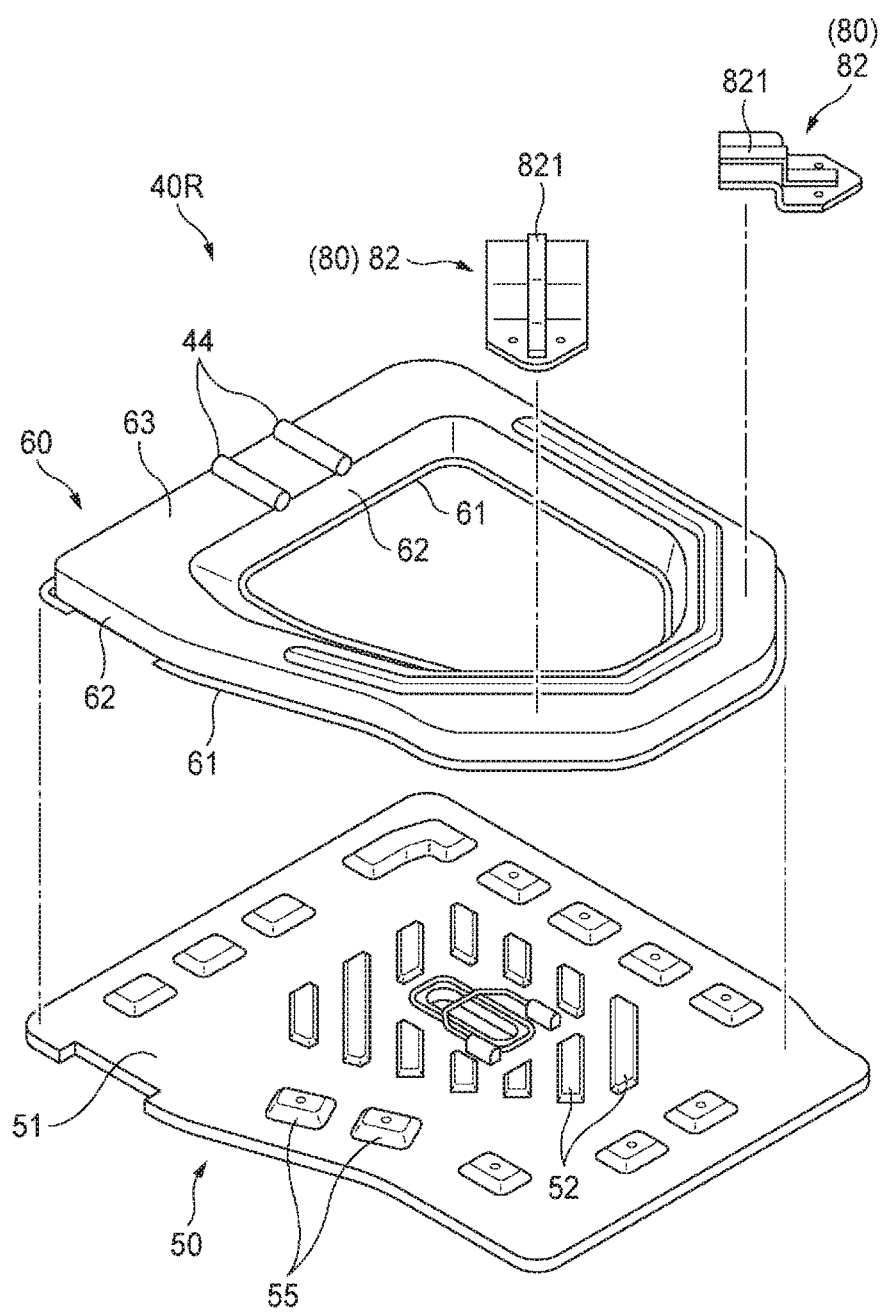
FIG. 7 is an exploded perspective view of a right back frame.

FIG. 7 is an exploded perspective view of the right back frame 40R. Since a dimension of the right back frame 40R in the left-right direction is smaller than that of the left back frame 40L, there is no occurrence that a large force is exerted as on the shaft portion 42 of the left back frame 40L. Therefore, a structure similar to that of the shaft portion 41 of the left back frame 40L is used at both the left and right ends of a lower end portion in the right back frame 40R.

Accordingly, structures similar to those of the left back frame 40L illustrated in FIG. 5 are denoted by the same reference numerals in FIG. 7, and a repetitive description thereof will be omitted.

The center portion bead 52 provided on the first member 50 of the right back frame 40R is provided in a direction intersecting or orthogonal to a virtual line L2 (see FIG. 2).

Second Embodiment

Figure 8:
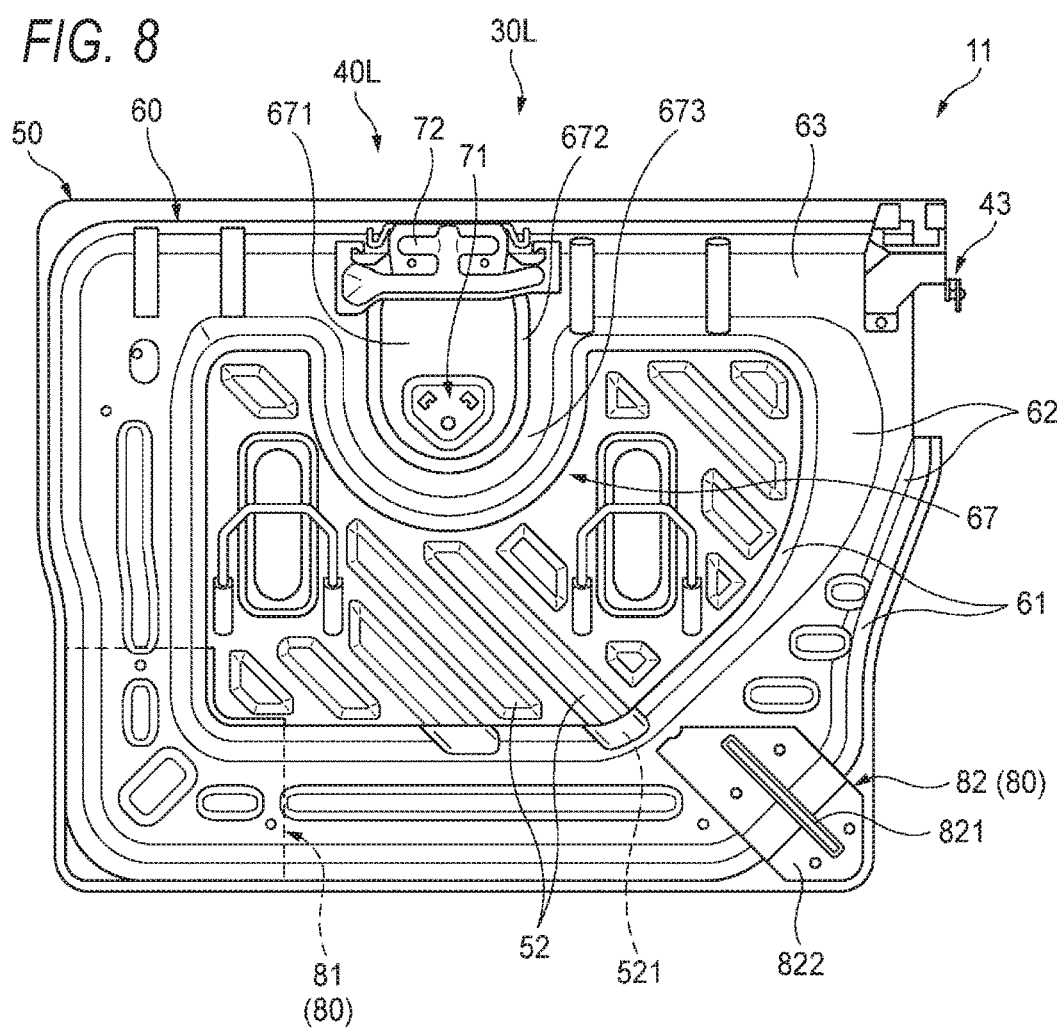
FIG. 8 is a front view of a left back frame in a vehicle seat according to a second embodiment of the present invention.

FIG. 8 is a front view of the left back frame 40L of a vehicle seat 11 according to a second embodiment of the present invention.

In the following description, components similar to those of the vehicle seat 10 of the first embodiment are denoted by the same reference numerals, and a repetitive description thereof will be omitted.

As illustrated in FIG. 8, in the left back frame 40L of the vehicle seat 11 of the second embodiment, a second member extension portion 67 is provided which is formed by extending a center portion in the left-right direction of an upper end portion of the second member 60 downward in a U shape. The second member extension portion 67 has, on an inner side (center portion), an extension surface 671 on the same plane as the flange portion 61, and the retractor fixing portion 71 is attached to the extension surface 671. An extension vertical wall portion 672 similar to the vertical wall portion 62 of the second member 60 is provided on an outer side of the extension surface 671, and an extension top plate 673 that is formed by extending the top plate 63 is provided in a U shape at an upper end of the extension vertical wall portion 672.

That is, the retractor fixing portion 71 is surrounded by the extension vertical wall portion 672 and the extension top plate 673 of the second member 60 instead of being surrounded by the surrounding bead 54 of the first member 50. Accordingly, the retractor fixing portion 71 can be reliably protected, and since the retractor fixing portion 71 can be provided at the same time during molding the second member 60, the number of components can be reduced.

Third Embodiment

Figure 9:
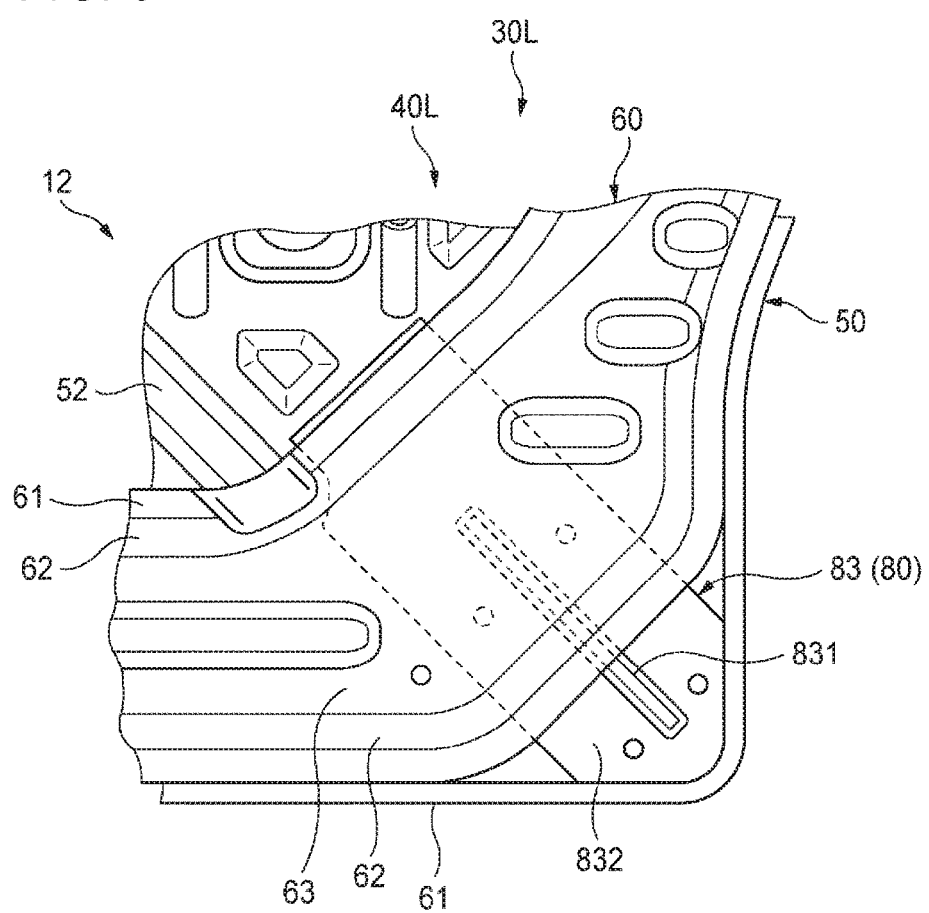
FIG. 9 is a front view of a back frame corresponding to a shaft portion, illustrating a state where a plate member is interposed between a first member and a second member in a vehicle seat according to a third embodiment of the present invention.

FIG. 9 is a front view of a main part of the left back frame 40L in a vehicle seat 12 according to a third embodiment of the present invention.

In the following description, components similar to those of the vehicle seat 10 of the first embodiment and the vehicle seat 11 of the second embodiment are denoted by the same reference numerals, and a repetitive description thereof will be omitted.

As illustrated in FIG. 9, instead of the second plate member 82 that is provided correspondingly to the shaft portion 41 (see FIG. 2) in the vehicle seat 10 of the first embodiment and the vehicle seat 11 of the second embodiment, a third plate member 83 is provided, as the plate member 80, in the left back frame 40L of the left seatback 30L of the vehicle seat 12 of the third embodiment. Differently from the second plate member 82, the third plate member 83 has a flat plate shape and the third plate member 83 is interposed between the first member 50 and the second member 60.

Since a plate member bead 831 protruding in a direction away from the first member 50 (that is, protruding forward) is provided on a surface of the third plate member 83 and the plate member bead 831 protrudes toward the second member 60, the flange portion 61 and the vertical wall portion 62 of the second member 60, which correspond to the plate member bead 831, are provided with a notch or a recessed portion so as not to interfere with the plate member bead 831.

An exposed portion 832 exposed from the second member 60 is provided at a portion corresponding to a corner portion of the first member 50 in the third plate member 83, and the shaft portion 41 is provided at a portion corresponding to the exposed portion 832 on a side of the first member 50 opposite from the second member 60 (see FIG. 2).

Similarly to the first plate member 81 described above, the third plate member 83 can be welded at one time by laser welding or spot welding in a state where the three of the first member 50, the second member 60, and the third plate member 83 are stacked on each other.

Even with this configuration, the same effects as those of the vehicle seat 10 of the first embodiment described above can be obtained.

As described above, a vehicle seat disclosed in the present specification includes a seat cushion and a seatback that are fixed to a body of a vehicle. The seatback includes a first member having a plate shape, a second member having a hat-shaped cross section of which a flange portion is in contact with one surface of the first member in a thickness direction thereof, and a center portion bead provided at a center portion of the first member. In a plan view viewed along the thickness direction of the first member, the second member overlaps with a longitudinal end portion of the center portion bead.

In the vehicle seat disclosed in the present specification, the first member may be provided with the center portion bead in a protruding manner toward the second member, and the second member may be provided with a tunnel portion correspondingly to the center portion bead, in a part of the flange portion and a vertical wall portion of the second member.

In the vehicle seat disclosed in the present specification, a planar portion of the first member and the flange portion of the second member may be fixed to each other.

The vehicle seat disclosed in the present specification may further include a first connection portion for detachably connecting an upper portion of the first member to a lateral portion of the body in a forward direction of the vehicle a second connection portion for rotatably connecting a lower portion of the first member to the lateral portion of the body in a forward direction of the vehicle, and a third connection portion that is adjacent to the second connection portion and is for rotatably connecting the lower portion of the first member. The center portion bead extends along a line intersecting or orthogonal to a line connecting the first connection portion and the third connection portion.

In the vehicle seat disclosed in the present specification, the second member may have a frame shape in a plan view.

As described above, a vehicle seat disclosed in the present specification includes a seat cushion and a seatback that are fixed to a body of a vehicle. The seatback includes a first member having a plate shape, a second member having a hat-shaped cross section of which a flange portion is in contact with one surface of the first member in a thickness direction thereof, and a fixing portion supported by one of the first member and the second member and configured to fix a retractor. In a plan view viewed along a stacking direction of the first member and the second member, a surrounding bead surrounding the fixing portion is provided on one of the first member and the second member.

In the vehicle seat disclosed in the present specification, the surrounding bead may be provided on the first member.

In the vehicle seat disclosed in the present specification, the surrounding bead may be continuous with the second member.

In the vehicle seat disclosed in the present specification may include a center portion bead that is provided at a center portion of the first member, a first connection portion for detachably connecting an upper portion of the first member to a lateral portion of the body in a forward direction of the vehicle, a second connection portion for rotatably connecting a lower portion of the first member to the lateral portion of the body in a forward direction of the vehicle, and a third connection portion that is adjacent to the second connection portion and is for rotatably connecting the lower portion of the first member. The center portion bead may extend along a line intersecting or orthogonal to a line connecting the first connection portion and the third connection portion.

In the vehicle seat disclosed in the present specification, the second member may have a frame shape in a plan view.

As described above, a vehicle seat disclosed in the present specification includes a seat cushion and a seatback that are fixed to a body of a vehicle. The seatback includes a first member having a plate shape, a second member having a hat-shaped cross section of which a flange portion is in contact with one surface of the first member in a thickness direction thereof, and accommodation beads provided at a portion of the first member which is covered by the second member. In a plan view viewed along a stacking direction of the first member and the second member, the accommodation beads are provided at a predetermined interval along a continuous direction of the second member.

In the vehicle seat disclosed in the present specification, the accommodation bead may be provided in a protruding manner toward the second member, and a through-hole may be provided in a planar portion of the accommodation bead.

In the vehicle seat disclosed in the present specification may include a center portion bead that is provided at a center portion of the first member, a first connection portion for detachably connecting an upper portion of the first member to a lateral portion of the body in a forward direction of the vehicle, a second connection portion for rotatably connecting a lower portion of the first member to the lateral portion of the body in a forward direction of the vehicle, and a third connection portion that is adjacent to the second connection portion and is for rotatably connecting the lower portion of the first member. The center portion bead may extend along a line intersecting or orthogonal to a line connecting the first connection portion and the third connection portion.

In the vehicle seat disclosed in the present specification, the second member may have a frame shape in a plan view.

As described above, a vehicle seat disclosed in the present specification includes a seat cushion and a seatback that are fixed to a body of a vehicle. The seatback includes a first member having a plate shape, a second member having a hat-shaped cross section of which a flange portion is in contact with one surface of the first member in a thickness direction thereof, and a plate member that is provided between the first member and the second member.

In the vehicle seat disclosed in the present specification, the plate member may be interposed between a planar portion of the first member and a flange portion of the second member.

In the vehicle seat disclosed in the present specification, a planar portion bead may be provided at a portion corresponding to the plate member, in a planar portion of the second member.

In the vehicle seat disclosed in the present specification, the planar portion of the first member, the flange portion of the second member, and the plate member may be integrally welded along a thickness direction of the plate member.

In the vehicle seat disclosed in the present specification, the plate member may have an exposed portion that is exposed to an outside from the flange portion of the second member, and the first member may be provided with a hinge portion at a portion that corresponds to the exposed portion and that is on a side opposite from the second member.

In the vehicle seat disclosed in the present specification, the plate member may be disposed along the planar portion of the first member, and along a surface of the flange portion, a surface of a vertical wall portion, and a surface of a planar portion, of the second member.

In the vehicle seat disclosed in the present specification, the plate member may be provided with a plate member bead that protrudes in a direction away from the first member.

In the vehicle seat disclosed in the present specification, the first member may be provided with a hinge portion on a side opposite form the second member, in the planar portion along which the plate member extends.

In the vehicle seat disclosed in the present specification may include a center portion bead that is provided at a center portion of the first member, a first connection portion for detachably connecting an upper portion of the first member to a lateral portion of the body in a forward direction of the vehicle, a second connection portion for rotatably connecting a lower portion of the first member to a lateral portion of the body in a forward direction of the vehicle, and a third connection portion that is adjacent to the second connection portion and is for rotatably connecting the lower portion of the first member. The center portion bead may extend along a line intersecting or orthogonal to a line connecting the first connection portion and the third connection portion.

In the vehicle seat disclosed in the present specification, the second member may have a frame shape in a plan view.

INDUSTRIAL APPLICABILITY

The present invention is applicable to passenger cars and other vehicles.

Although the embodiments of the present invention have been described in detail above, these are merely examples, and the present invention can be implemented in a mode with various modifications without departing from the spirit of the present invention.

REFERENCE SIGNS LIST

10, 11, 12 vehicle seat
20 seat cushion
30 seatback
41 shaft portion (second connection portion)
42 shaft portion (third connection portion)
43 seatback fixing portion (first connection portion)
50 first member
51 rear surface (planar portion of first member)
52 center portion bead
54 surrounding bead
55 accommodation bead
553 planar portion (planar portion of accommodation bead)
554 through-hole
60 second member
61 flange portion
62 vertical wall portion
63 top plate (planar portion of second member)
66 planar portion bead
65 tunnel portion
71 retractor fixing portion (fixing portion)
80 plate member
811, 821, 831 plate member bead
812, 822, 832 exposed portion
101 body
L1, L2 virtual line (connection line)

The invention claimed is:

1. A vehicle seat comprising a seat cushion and a seatback that are fixed to a body of a vehicle,
   the seatback including:
      a first member having a plate shape;
      a second member having a hat-shaped cross section of which a flange portion is in contact with one surface of the first member in a thickness direction thereof; and
      a center portion bead provided at a center portion of the first member,
   wherein in a plan view viewed along a thickness direction of the first member, the second member overlaps with a longitudinal end portion of the center portion bead, and
   wherein the second member extends in a direction intersecting a longitudinal direction of the center portion bead.

2. The vehicle seat according to claim 1,
   wherein the first member is provided with the center portion bead in a protruding manner toward the second member, and
   wherein the second member is provided with a tunnel portion in a part of the flange portion and a vertical wall portion of the second member, the part overlapping with the longitudinal end portion of the center portion bead.

3. The vehicle seat according to claim 2,
   wherein a planar portion of the first member and the flange portion of the second member are fixed to each other.

4. The vehicle seat according to claim 1, further comprising:
   a first connection portion for detachably connecting an upper portion of the first member to a lateral portion of the body in a forward direction of the vehicle;

a second connection portion for rotatably connecting a lower portion of the first member to the lateral portion of the body in a forward direction of the vehicle; and
a third connection portion that is adjacent to the second connection portion and is for rotatably connecting the lower portion of the first member,
wherein the center portion bead extends along a line intersecting a line connecting the first connection portion and the third connection portion.

5. The vehicle seat according to claim 1,
wherein the second member has a frame shape in a plan view.

6. A vehicle seat comprising a seat cushion and a seatback that are fixed to a body of a vehicle,
the seatback including:
a first member having a plate shape;
a second member having a hat-shaped cross section of which a flange portion is in contact with one surface of the first member in a thickness direction thereof; and
accommodation beads provided at a portion of the first member which is covered by the second member,
wherein in a plan view viewed along a stacking direction of the first member and the second member, the accommodation beads are provided at a predetermined interval along a continuous direction of the second member,
wherein the accommodation bead is provided in a protruding manner toward the second member, and
wherein a through-hole is provided in a planar portion of the accommodation bead.

7. The vehicle seat according to claim 6,
wherein the second member has a frame shape in a plan view.

8. The vehicle seat according to claim 6, comprising:
a center portion bead that is provided at a center portion of the first member;
a first connection portion for detachably connecting an upper portion of the first member to a lateral portion of the body in a forward direction of the vehicle;
a second connection portion for rotatably connecting a lower portion of the first member to the lateral portion of the body in a forward direction of the vehicle; and
a third connection portion that is adjacent to the second connection portion and is for rotatably connecting the lower portion of the first member,
wherein the center portion bead extends along a line intersecting a line connecting the first connection portion and the third connection portion.

9. A vehicle seat comprising a seat cushion and a seatback that are fixed to a body of a vehicle,
the seatback including:
a first member having a plate shape;
a second member having a hat-shaped cross section of which a flange portion is in contact with one surface of the first member in a thickness direction thereof; and
a fixing portion provided on a flange extension portion, which extends from the flange portion of the second member along the one surface of the first member and is in a semicircular shape, and configured to fix a retractor, and
wherein in a plan view viewed along a stacking direction of the first member and the second member, a surrounding bead that surrounds the fixing portion, in a semicircular shape along the flange extension portion, is provided on one of the first member and the second member.

10. The vehicle seat according to claim 9,
wherein the surrounding bead is provided on the first member.

11. The vehicle seat according to claim 9,
wherein the surrounding bead is continuous with the second member.

12. The vehicle seat according to claim 9, comprising:
a center portion bead that is provided at a center portion of the first member;
a first connection portion for detachably connecting an upper portion of the first member to a lateral portion of the body in a forward direction of the vehicle;
a second connection portion for rotatably connecting a lower portion of the first member to the lateral portion of the body in a forward direction of the vehicle; and
a third connection portion that is adjacent to the second connection portion and is for rotatably connecting the lower portion of the first member,
wherein the center portion bead extends along a line intersecting a line connecting the first connection portion and the third connection portion.

13. The vehicle seat according to claims 9,
wherein the second member has a frame shape in a plan view.

14. A vehicle seat comprising a seat cushion and a seatback that are fixed to a body of a vehicle,
the seatback including:
a first member having a plate shape;
a second member having a hat-shaped cross section of which a flange portion is in contact with one surface of the first member in a thickness direction thereof; and
a plate member provided between the first member and the second member,
wherein the first member, the flange portion of the second member, and the plate member are continuously welded through the plate member, and welded portions are provided intermittently along the flange portion.

15. The vehicle seat according to claim 14,
wherein the plate member is interposed between a planar portion of the first member and the flange portion of the second member.

16. The vehicle seat according to claim 15,
wherein a planar portion bead is provided at a portion corresponding to the plate member, in a planar portion of the second member.

17. The vehicle seat according to claim 15,
wherein the planar portion of the first member, the flange portion of the second member, and the plate member are integrally welded along a thickness direction of the plate member.

18. The vehicle seat according to claim 15,
wherein the plate member has an exposed portion that is exposed to an outside from the flange portion of the second member, and
wherein the first member is provided with a hinge portion at a portion that corresponds to the exposed portion and that is on a side opposite from the second member.

19. The vehicle seat according to claim 14,
wherein the plate member is disposed along a planar portion of the first member, and along a surface of the flange portion, a surface of a vertical wall portion, and a surface of a flat portion, of the second member.

20. The vehicle seat according to claim 19,
wherein the plate member is provided with a plate member bead that protrudes in a direction away from the first member.

21. The vehicle seat according to claim 19,
wherein the first member is provided with a hinge portion on a side opposite from the second member, in the planar portion along which the plate member extends.

22. The vehicle seat according to claim 14, comprising:
a center portion bead that is provided at a center portion of the first member;
a first connection portion for detachably connecting an upper portion of the first member to a lateral portion of the body in a forward direction of the vehicle;
a second connection portion for rotatably connecting a lower portion of the first member to the lateral portion of the body in a forward direction of the vehicle; and
a third connection portion that is adjacent to the second connection portion and is for rotatably connecting the lower portion of the first member,
wherein the center portion bead extends along a line intersecting a line connecting the first connection portion and the third connection portion.

23. The vehicle seat according to claims 14,
wherein the second member has a frame shape in a plan view.

* * * * *